United States Patent [19]

Scheible

[11] Patent Number: 4,574,317
[45] Date of Patent: Mar. 4, 1986

[54] HAND SCANNABLE PORTABLE COPIER AND METHOD

[76] Inventor: Wayne Scheible, 9 Fencewood La., Hamlin, N.Y. 14464

[21] Appl. No.: 560,469

[22] Filed: Dec. 12, 1983

[51] Int. Cl.[4] .................. H04N 1/04; H04N 1/10; H04N 1/23
[52] U.S. Cl. .................. 358/285; 358/286; 358/293; 358/296; 235/432; 235/472; 382/59
[58] Field of Search ............... 358/285, 286, 293, 296, 358/300, 301, 302, 256, 294; 346/76 PH; 355/7, 21, 25, 84, 82; 382/59; 235/472, 432

[56] References Cited

U.S. PATENT DOCUMENTS

| | | | |
|---|---|---|---|
| 3,073,234 | 1/1963 | Rogomti | 355/82 |
| 4,319,283 | 3/1982 | Ozawa et al. | 358/293 |
| 4,377,741 | 3/1983 | Brekka et al. | 235/432 |
| 4,523,235 | 6/1985 | Rajchman | 358/294 |

Primary Examiner—James J. Groody
Assistant Examiner—John K. Peng
Attorney, Agent, or Firm—Alfred B. Levine

[57] ABSTRACT

A miniature hand scannable portable copier for use by students and others in copying documents or excerpts of documents, and comprised of a solid state optical sensor array and a thermal print head array supported within a pocket sized housing in substantially coplanar relationship to each other and to both the original and copy sheets of paper. In one method copies are made using a partially or fully transparent thermal copy sheet by passing scanning light through the copy sheet to be reflected back from the original image to be copied underneath. In an alternative method, the copy sheet and original are arranged in overlapping relationship and the copy is made alongside the original and in the same plane.

9 Claims, 6 Drawing Figures

HAND SCANNABLE PORTABLE COPIER AND METHOD

FIELD OF INVENTION

This invention generally relates to miniature, pocket sized portable copiers for reproducing printed and graphical images, and more particularly to a hand scannable portable copier and method of copying for concurrently reproducing the image on copy paper as the original is being scanned by the user.

BACKGROUND AND ADVANTAGES

Students, researchers, attorneys, and many others often are required to laboriously hand copy portions or excerpts from library texts or other printed materials. Students, in particular, as well as writers and researchers in other fields spend a great deal of time in abstracting textbooks in preparation for examinations and presentations. Although most public and private libraries presently have photocopying machines for reproducing pages of originals, these machines are frequently in use by others when needed, or are out of service, or require supplies, or are otherwise not convenient. Additionally, many times there is no need for copying the entire pages of the reference work but only excerpts or portions of the work, such as summaries, tables, quotations, or graphs.

Many efforts have been made in the past to provide an inexpensive and portable copier for these purposes, and a number of patents have issued disclosing copiers to solve this problem. For example, a series of patents have issued to Garfield U.S. Pat. Nos. 3,054,248; 3,052,755; 3,064,078; and others. All of these patents, however require the use of manually scanned optical sensors or probes connected by cable to a separate printer that at best is required to be carried in a briefcase, and is not as small and portable as desired.

Other patents have issued for photographic types of copiers, or others that purport to be small and portable but require scanning mechanisms or guides for the optical scanners as are variously disclosed in Sheridan U.S. Pat. No. 2,292,668; Roganti U.S. Pat. No. 3,073,234; Roosen U.S. Pat. No. 3,884,518; and Ozawa U.S. Pat. No. 4,319,283.

SUMMARY OF THE INVENTION

According to the present invention there is provided a copier in small pocket sized form that is employed by the user to manually scan portions, quotes, or abstracts of printed materials to be copied and to concurrently reproduce the scanned images at a displaced position on a separate sheet of paper located on top of the original or alongside the original but in the same plane as the original. In one preferred embodiment a light source, optical reader or sensor, thermal printer, and power source are all provided in miniature solid state form within a small case or housing that can be be readily accomodated within the small space of a shirt pocket or purse. The thermally sensitive copy paper is supplied in the form of sheets or strips, that are easily carried separately in a pad, or a flat notebook, or in a flat folder. The copy paper in a small roll may also be contained within the case or housing. In the preferred arrangement, the sensor mechanism and printer are arranged in substantially co-planar relationship to both scan and print in one plane.

In one preferred method of copying, the sheet of thermally sensitive copy paper is provided in transparent or translucent form, and is placed to overlie the original document to be copied. The pocket copier is placed on top of the copy paper and a light beam is projected through the copy sheet and reflected from the original image underneath back through the copy sheet to an optoelectric sensor lens or optical fibres in the copier. As the copier is manually scanned across the printed line or other image on the original, the optoelectric sensor receives the changing reflected image and concurrently energizes the thermal print head to print the image on top of the copy sheet. In this preferred arrangement, the optical sensor and thermal printer are disposed in a substantially coplanar relationship within the case but displaced from one another so that the user can observe both the image being manually scanned and the copy being printed concurrently with the scanning movement.

DESCRIPTION OF PREFERRED EMBODIMENTS

Figure 1:
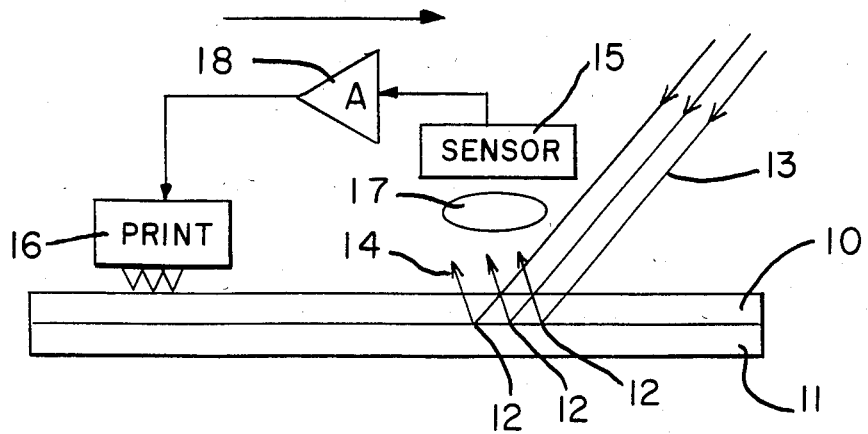
FIG. 1 is a schematic illustration showing one preferred method of scanning and copying in one plane.
Figure 1A:
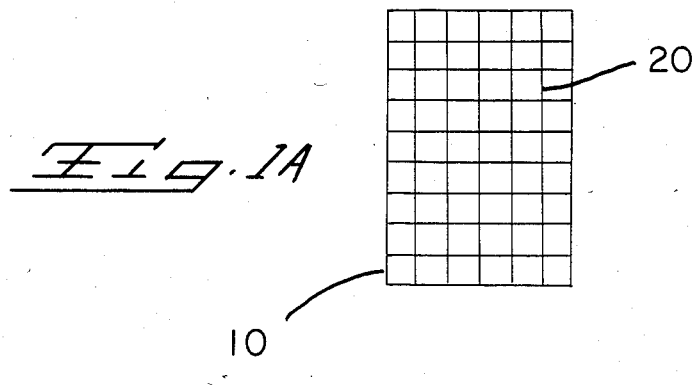
FIG. 1a is a plan view showing a sheet of copy paper having guide lines to assist in straight line scanning.

Referring to the drawings, FIG. 1 shows a preferred method of copying wherein a copy sheet 10 is positioned to overlie the original document 11 to be copied, and the copier is located on top of the copy sheet 10 and scans the original document 11 through the copy sheet 10. The copy sheet 10 is provided as a transparent or translucent sheet of thermally sensitive paper, permitting passage of illuminating light rays 13 through the copy sheet 10 to be reflected from the image 12 on the original 11, and passed backward at 14 through the copy sheet 10 to a photosensor 15 within the copier. In this method the photosensor 15 and a thermal print head 16 are supported within the copier in a substantially coplanar relationship but laterally spaced apart from one another. The print head 16 therefore prints the copied image on the upper surface of the copy sheet 10 at a position laterally displaced from the scanned image 12 on the original. As further shown, the reflected light 14 is focused by a lens 17 onto the photosensor 15 where the image is converted to an electrical signal. This signal is amplified by amplifier 18, and then is applied to the thermal print element or print head 16 to variably apply a corresponding heat image to the copy sheet 10 to reproduce the scanned image portion. As the copier is manually positioned from left to right across the superposed copy sheet 10 and original 11 to scan the changing image 12 on the original 11, the scanned image 12 is identically reproduced on the upper side of the copy sheet 10 but at laterally displaced positions of the print head 16 from the original image 12. The user of the copier can therefore continuously observe both the original image 12 and the copied image as it is being made, and can manually vary the speed of scanning the copier as well as the direction of scan to obtain the desired darkness of the copied thermal image and to insure that the desired portion of the image or excerpt is being copied.

Where the image being copied is in the form of uniformly printed lines of type in a textbook or other document, the user merely guides the hand copier to follow one of the printed lines, just as if a student were underlining a straight line of text with a pencil. On the other hand where the image to be copied is in the form of a drawing, diagram, or other graphic presentation, the copy paper being used may be preprinted with light reference lines 20 as shown in FIG. 1A, and the user merely guides the copier to follow desired ones of the reference lines thereby to obtain straight line scans of the desired portions of the image 12 on the original 11.

Figure 3:
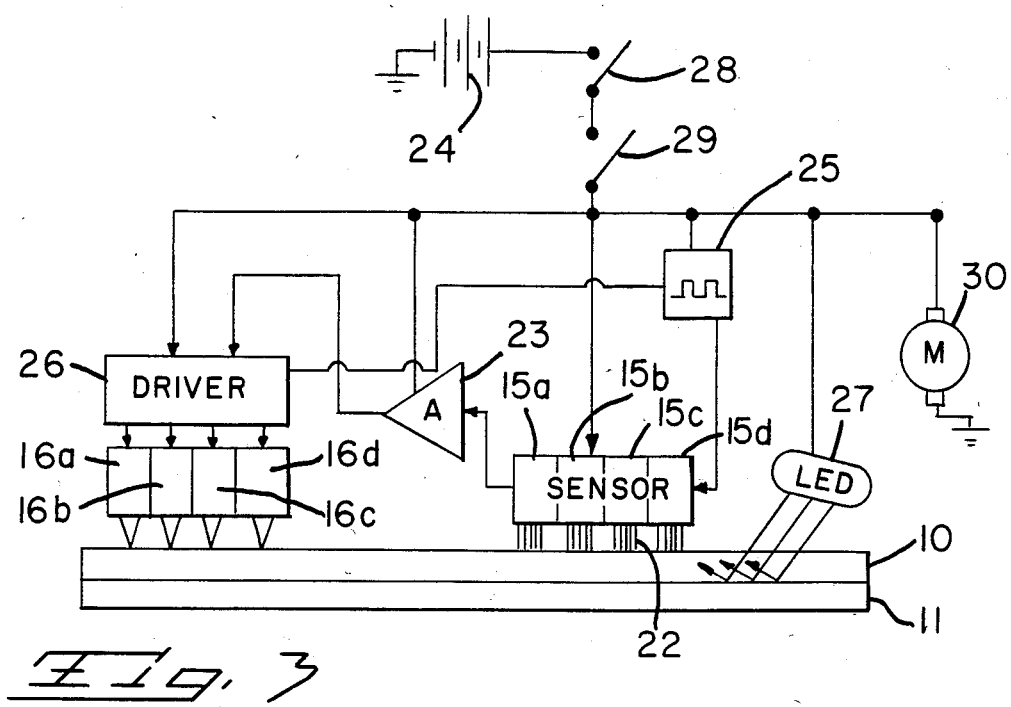
FIG. 3 is a sectional view, partly in schematic form, showing the components of a preferred embodiment and their interconnection.

FIG. 3. schematically shows one preferred copier structure wherein the optical sensor 15 is provided as a solid state, linear photosensor array having an array of photosensitive elements, such as 15a, 15b, 15c, and 15d. Instead of a lens for focusing the image 12 onto the array 16, a fibre optic faceplate 22 is preferably employed to reduce the bulk and expense of the unit. The printhead 16 is also provided as an linear array having a like number of print elements 16a, 16b, 16c, and 16d with each of the thermal print elements 16 connected to be energized by the corresponding one of the photosensor elements 15.

Although the different elements of the photosensor array 15 may be directly connected to energize the corresponding thermal print head elements 16 through a different stage of a multistage amplifier 23, it is preferred instead to use only a single amplifier stage 23 and to sequently interconnect, or strobe, each different stage of the photosensor array 15 to its corresponding stage of the print head array 16. This preferred strobing arrangement reduces both the size and cost of the copier electronics as well as reducing the power requirements supplied by a portable battery 24. For sequentually strobing the photo sensor 15 and thermal printer 16, a solid state clock chip 25 is provided to syncronously energize both the sensor array 15 and the driver circuit 26 for the printer array 16 such that each of the elements of the photosensor 15 sequentually is interconnected to the corresponding elements of the printhead 15.

A solid state light source 27, that may be a light emitting diode (LED), is preferred for illuminating the original 11 to be copied, and this light source 27 is included as an integral part of the portable copier unit. If desired, a miniature constant speed motor and drive mechanism 30 may also be included, to assist in constant speed scanning of the image to be copied. An on-off switch 28 is provided for manually applying power to the circuit along with a contact switch 29, in the event that the drive motor 30 is included, as will be described hereafter.

Figure 2:
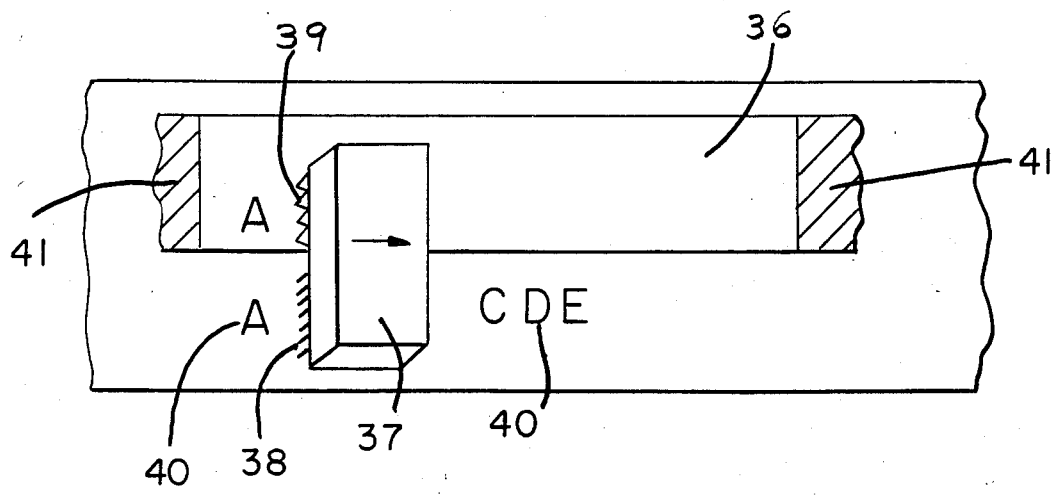
FIG. 2 is an overhead view showing a different method of copying on a strip of copy paper displaced from the original.

FIG. 2 shows an alternative method and arrangement for copying excerpts or portions of data from an original document 40 onto a narrower strip or roll 36 of thermally sensitive paper that is positioned alongside of but does not overlie the printed protions of document 40 to be copied. In this alternative method, the combined sensor-printer is arranged with its linear photosensor array 38 positioned directly above the portions of the original document 40 to be copied, and is displaced from the copy strip 36. The thermal printhead array 39, is disposed immediately above the copy strip 36 and displaced from the sensor 38. As the pocket copier 37 is hand scanned across the original from left to right to read the desired portions 40 of the original, the print-head array 39 correspondingly traverses the narrow strip of copy paper 36 to record the scanned information. In this arrangement, the image on original 40 and the recorded image on copy paper 36 are arranged in side-by-side relationship and the user can also observe both images as the copy is being made. The user can therefore control the density or darkness of the thermal copy being made by speeding up or slowing down the rate of scanning, and can change the direction of scanning in a straight line to read and copy different portions of the original 40. Where the information being copied is in the form of printed words, the user need only follow a desired one of the printed lines to obtain a linear scan, just as if that line or printing was being underlined in pencil. On the other hand, where graphical images are being copied, the strip of copy paper may be provided with lightly shaded guide lines 20, similar to those shown in FIG. 1, to assist in guiding the hand copier 37 in straight line scans.

To prevent undesired movement of the strip of copy sheet 36 in FIG. 2 during scanning of the copier 37, one or both edges 41 of the strip 36 may be provided with a pressure sensitive adhesive, to temporarily adhere the strip 36 to the original 40. Alternatively, the copy strip 36 may be held down in place by the user with one hand, while the other hand manually scans the copier 37 over the original 40.

Figure 4:
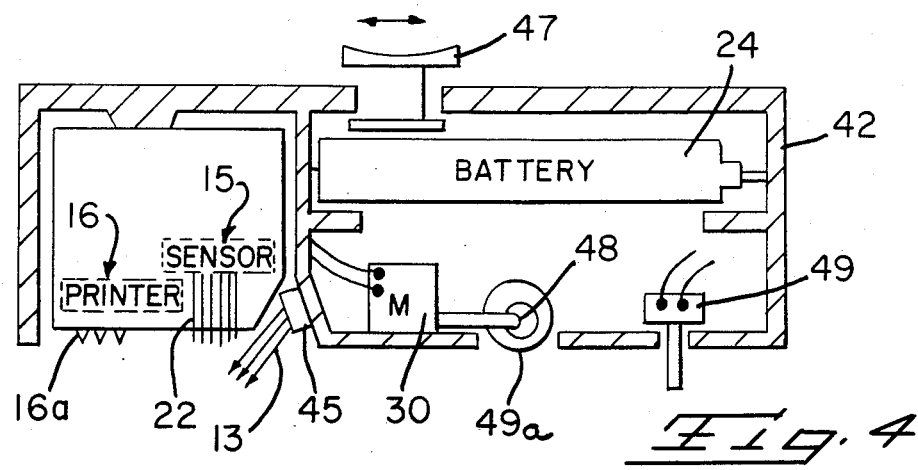
FIG. 4 is a cross sectional view through the case or housing of a preferred embodiment.

FIG. 4 shows a unitized construction for the miniature copier supported within a pocket sized outer case or housing 42. As shown, the linear photosensor array 15 and the thermal printhead array 16 are rigidly supported together within a potted plastic module 44 that is accomodated within a partially enclosed compartment of the case 42. The module 44 is formed by positioning the sensor array 15 and printhead array 16 in the desired spaced apart coplanar relationship and incapsulating these components within a conventional plastic potting compound. As shown a fibreoptic faceplate 22 leading to the sensor array 15 extends to the planar base of the module 44 at a forward position, and the tips 16a of the thermal elements of the printhead array 16 project slightly beyond the planar base at the rear of the module 44. Inside the module 44 is also encapsulated other of the electronic components shown in FIG. 3 including the amplifier 23, the printhead driver chip 26, and the clock chip 25. A solid state light source 45 is supported on an inclined wall of the case 42 close to the photosensor 15 and inclined to direct light 13 toward the original and to reflect the image back to the photosensor array 15, as shown.

Alongside of the sensor-printhead module 44, is provided a compartment for the battery 24; and below the battery compartment is accomodated the constant speed miniature drive motor 30. As shown, the motor 30 is coupled by a worm gear and spur gear 48 to drive a friction wheel 49 or rubber surfaced drum, that projects through an opening in the base of the case 42 to engage the upper surface of the document or copy paper (not shown in FIG. 4). As discussed above, the constant speed motor drive mechanism may be provided to assist the user in obtaining constant speed scanning of the original. However since the user can easily observe both the original document being copied along with the copy being made, it is not considered essential to provide such a motor assisting drive mechanism.

At the top of the case 41 is provided a manually operated slide button 47 for operating the on-off power switch 28 (FIG. 3), and projecting from the base of the housing 41 at the far right is a push button 49 that operates the contact switch 29 (FIG. 3). Closure of both switches is required to apply power from the battery 24 to the copier module 44 and to the drive motor 30, as shown in FIG. 3. The slide switch button 47 is manually operated by the user in preparation for operating the copier, and the push button 49 for contact switch 29 is depressed when the copier is placed against the paper to commence scanning and copying the document.

Figure 5:
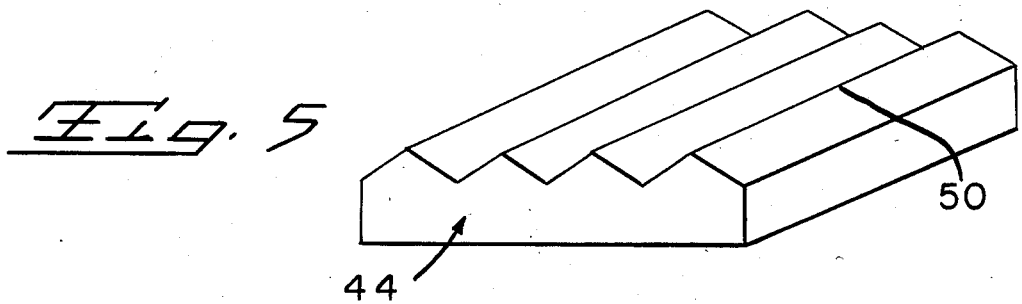
FIG. 5 is a perspective view of a portion of the base of the case or housing, to assist in straight line scanning of the original.

To assist the user in manually scanning the copier in straight line scans, various base portions of the case 41 or of the module 44, may be provided with straight line ridges 50 and grooves or with striation that are aligned in the desired direction of scanning, as illustrated in FIG. 5. These ridges 50 make it easier for the user to move the copier over the paper in the straight line direction of the ridges 50 rather than transversely or obliquely to the ridges 50.

Linear array thermal printheads as disclosed in FIG. 3 and described herein are presently available on the open market in miniature form and in different sizes and lengths. They can be obtained in both thin film and thick film form, and combined in an integrated manner by the manufacturer with the sequentually operating drive circuits or strobes 26 as disclosed in FIG. 3. One manufacturer of such solid state components is the Rohm company of Irvine, Calif., providing both the thick film and thin film types of thermal printhead arrays. Solid state miniature linear phtosensor arrays are also available on the open market and can be obtained in miniature self-scanning or self-strobing configuration as described. One manufacturer of such components is Integrated Photomatrix Inc. of Mountainside, N.J.

I claim:

1. A hand held copier, completely solid state, combined scanner and printer comprising:
    a miniature light source,
    an optoelectric sensor including a solid state miniature linear array and optical focusing means,
    a solid state miniature print head array,
    said light source, sensor, and print head all being fixedly mounted on the same side of a support in spaced apart relationship to concurrently scan and print out the scanned image in coplanar relationship but at laterally spaced apart positions,
    whereby the manually controlled positioning and scanning of a document to be copied enables the concurrent scanning and printing of the image to be copied at laterally spaced apart positions as the original document is traversed by the copier.

2. In the combined scanner and printer of claim 1, said sensor including a fibreoptic element disposed to observe the original document in the same plane as printing by the print head array but at a laterally spaced apart position from the printing.

3. In the copier of claim 1, said sensor and print head array being combined within a potted module having a planar base portion to engage both the original document to be copied and the print medium to receive the copy, and with the print head and portions of the sensor disposed near said base portion.

4. In the copier of claim 1, a miniature constant speed drive including a drive motor and document engaging wheel located near the sensor and print head and coplanar relationship therewith.

5. In the copier of claim 1, a separate guide element provided to assist the user in scanning the original document in straight lines, said guide element including a ridge projecting from the base of the copier to engage the document to be scanned and to provide a straight line path of least resistance as the copier is traversed over the original.

6. A hand held copier, completely solid state, combined scanner and printer comprising:
    a miniature light source,
    an optoelectric sensor including a solid state miniature linear array and optical focusing means,
    a solid state miniature print head array,
    said light source, sensor, and print head all being fixedly mounted together on the same side, and in spaced apart relationship to concurrently scan and print out the scanned image in coplanar relationship but at laterally spaced apart positions,
    whereby the manually controlled positioning and scanning of a document to be copied enables the concurrent scanning and printing of the image to be copied at laterally spaced apart positions as the original document is traversed by the copier,
    and a separate guide member to assist the user in hand scanning the original in straight lines.

7. In the copier of claim 6, said separate guide element to assist the user in scanning the original document in straight lines comprising a sheet having guide lines to be positioned in fixed relationship to the original and providing a visually observable path to be followed by the user in manually scanning the copier over the original document.

8. A method for concurrently scanning and copying excerpts of an optical image comprising the steps of:
    disposing at least a partially transparent heat sensitive copy medium on top of the original to be copied,
    directing a light through the medium to reflect from the original and pass backwardly through the copy medium to an optoelectric sensor,
    moving the light and sensor together to scan the image on the original, and concurrently moving a thermal print head in fixed position with respect to the sensor but at a spaced apart location therewith, and coplanar with respect to the sensor, said thermal print head being in heat transferring relationship with the copy medium and heating the medium concurrently with the scanning of the original and at a spaced apart position with respect to the scanned image.

9. A method for concurrently scanning and copying an optical image comprising the steps of:
    disposing at least a partially transparent heat sensitive copy medium alongside of the optical image to be copied and fixed in position therewith,
    moving an optical sensor and thermal print head together in fixed spaced apart relationship to concurrently scan the optical image and print the scanned image at (displaced) spaced apart positions on the fixed copy medium,
    said sensor and thermal print head being supported in fixed coplanar relationship with each other, and coplanar to both the copy medium and the image to be copied, and said copy medium being immovable during printing.

* * * * *